US012682277B2

(12) United States Patent (10) Patent No.: US 12,682,277 B2

Ramanan et al. (45) Date of Patent: Jul. 14, 2026

(54) TEMPORAL DRIFT DETECTION

(71) Applicant: Palo Alto Networks, Inc., Santa Clara, CA (US)

(72) Inventors: Nandini Ramanan, San Jose, CA (US); Claudionor Jose Nunes Coelho Junior, Redwood City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 1157 days.

(21) Appl. No.: 17/581,346

(22) Filed: Jan. 21, 2022

(65) Prior Publication Data

US 2023/0123157 A1 Apr. 20, 2023

Related U.S. Application Data

(60) Provisional application No. 63/252,767, filed on Oct. 6, 2021.

(51) Int. Cl.
G06N 20/00 (2019.01)
H04L 9/40 (2022.01)

(52) U.S. Cl.
CPC ......... G06N 20/00 (2019.01); H04L 63/1416 (2013.01)

(58) Field of Classification Search
CPC ........ G06N 20/00; G06N 3/045; G06N 20/20; H04L 63/1416; H04L 2463/144; H04L 63/1425; G06F 21/552
See application file for complete search history.

(56) References Cited

U.S. PATENT DOCUMENTS

| | | | | |
|---|---|---|---|---|
| 10,599,957 B2 * | 3/2020 | Walters | ................... | G06F 9/541 |
| 11,165,800 B2 * | 11/2021 | Thampy | .............. | H04L 63/1425 |
| 2010/0030544 A1 * | 2/2010 | Gopalan | ............... | H04L 43/022 |
| | | | | 703/13 |
| 2017/0279698 A1 * | 9/2017 | Sartran | ............... | H04L 43/0823 |
| 2018/0324199 A1 * | 11/2018 | Crotinger | ............ | G06F 11/3419 |
| 2022/0188410 A1 * | 6/2022 | Allahdadian | ....... | G06F 18/2135 |
| 2023/0093130 A1 * | 3/2023 | Fenoglio | ............. | G06F 18/2433 |
| | | | | 709/224 |

OTHER PUBLICATIONS

Poghosyan, Amnak, et al. "An enterprise time series forecasting system for cloud applications using transfer learning." Sensors 21.5 (2021): 1590. (Year: 2021).*

Chowdhury Tondra, Farhana. "Investigation and forecasting drift component of a gas sensor." (2021). (Year: 2021).*

(Continued)

*Primary Examiner* — Kevin W Figueroa
*Assistant Examiner* — Victor Adelard Nault
(74) *Attorney, Agent, or Firm* — Van Pelt, Yi & James LLP

(57) ABSTRACT

The present application discloses a method, system, and computer system for determining whether to train a machine learning model. The method includes analyzing a set of data for temporal drift detection, determining that a resultant stationary series has changed from training data, and in response to determining that the resultant stationary series has changed, automatically updating the machine learning model, wherein the machine learning model is trained based at least in part on a set of training data.

18 Claims, 9 Drawing Sheets

600

(56)  References Cited

OTHER PUBLICATIONS

Tan, Guolin, et al. "Adaptive malicious URL detection: Learning in the presence of concept drifts." 2018 17th IEEE International Conference on Trust, Security and Privacy in Computing and Communications/12th IEEE International Conference on Big Data Science and Engineering. IEEE, 2018. (Year: 2018).*

Baier, Lucas, et al. "Switching scheme: a novel approach for handling incremental concept drift in real-world data sets." arXiv preprint arXiv:2011.02738 (2020). (Year: 2020).*

Poghosyan, Arnak, et al. "An enterprise time series forecasting system for cloud applications using transfer learning." Sensors 21.5 (2021): 1590. (Year: 2021).*

Pritzsche, Uwe. Benchmarking of classical and machine-learning algorithms (with special emphasis on bagging and boosting approaches) for time series forecasting. Diss. 2015. (Year: 2015).*

Jia, Wenxiao, et al. "Integrating multiple data sources and learning models to predict infectious diseases in China." AMIA Summits on Translational Science Proceedings 2019 (2019): 680. (Year: 2019).*

Choi, Kukjin, et al. "Deep learning for anomaly detection in time-series data: Review, analysis, and guidelines." IEEE access 9 (2021): 120043-120065. (Year: 2021).*

Bernacki, Jarosław, and Grzegorz Kołaczek. "Anomaly detection in network traffic using selected methods of time series analysis." International Journal of Computer Network and Information Security 7.9 (2015): 10-18. (Year: 2015).*

Karingula, Sankeerth Rao, et al. "Boosted Embeddings for Time Series Forecasting." arXiv preprint arXiv:2104.04781v2 (2021). (Year: 2021).*

Breck et al. Data Validation for Machine Learning. Proceedings of the 2nd SysML Conference, Palo Alto, CA, USA, 2019.

Brynjolfsson et al. What can machine learning do? Workforce implications. sciencemag.org. vol. 358, Issue 6370. Dec. 22, 2017.

Schelter et al. On Challenges in Machine Learning Model Management. IEEE. Bulletin of the IEEE. 2015.

Vartak et al. MODELDB: A System for Machine Learning Model Management. HILDA'16, Jun. 26, 2016, San Francisco, CA, USA. DOI: http://dx.doi.org/10.1145/2939502.2939516.

Webb et al. Machine Learning for User Modeling. User Modeling and User-Adapted Interaction 11: 19-29, 2001. (c) 2001 Kluwer Academic Publishers. (in revised form May 22, 2000).

* cited by examiner

200

205

COMMUNICATION INTERFACE

210

PROCESSOR(S)

225

COMMUNICATION MODULE

230

SERIES DATA MODULE

235

SEASONAL DATA MODIFICATION MODULE

240

DRIFT DETECTOR MODULE

245

RE-TRAINING MODULE

250

NOTIFICATION MODULE

215

STORAGE

260

FILESYSTEM DATA

262

MODEL DATA

264

CACHE DATA

220

MEMORY

270

EXECUTING APPLICATION DATA

350 timegenerated

400

500

700

<u>800</u>

TEMPORAL DRIFT DETECTION

CROSS REFERENCE TO OTHER APPLICATIONS

This application claims priority to U.S. Provisional Patent Application No. 63/252,767 entitled REAL-TIME DRIFT DETECTION ON TIME-SERIES DATA filed Oct. 6, 2021, which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data.

Some techniques to detect malware and prevent its harm include the deployment of one or more machine learning models. For example, one or more machine learning models are deployed to determine whether traffic is malicious. As another example, one or more machine learning models are deployed to determine whether a domain is malicious. Various other implementations for using machine learning models to detect/prevent may be deployed. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

Figure 1:
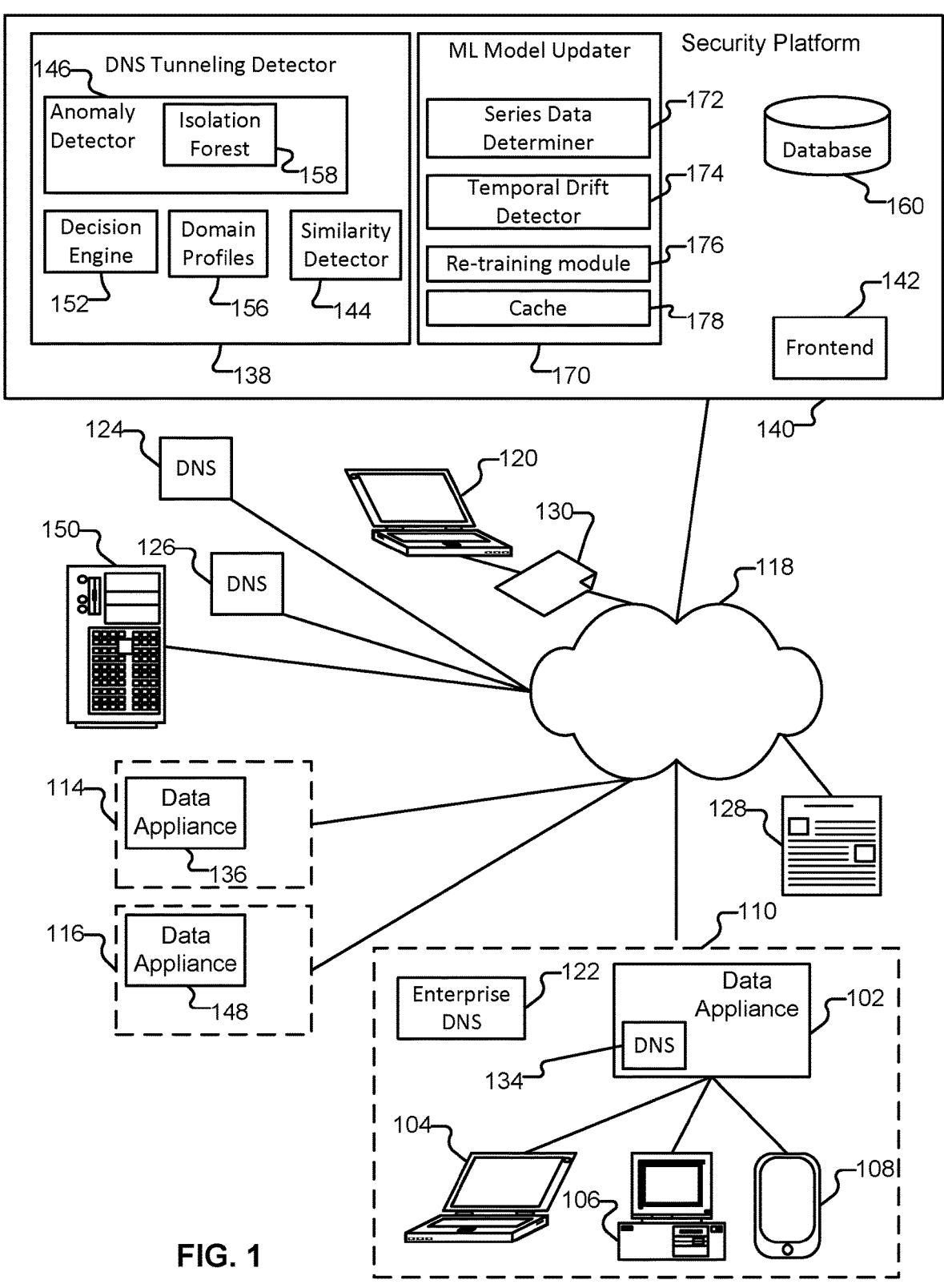
FIG. 1 is a block diagram of an environment in which temporal drift of data corresponding to a model is detected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity.

As used herein, malware refers to an application that engages in behaviors, whether clandestinely or not (and whether illegal or not), of which a user does not approve/ would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

According to related art, malware is identified using machine learning models (also referred to herein as "models"). As an example, models according to related art may be trained/developed using portable executable (PE) structures based on features such as imports, headers and sections, and the models use such imports, headers and sections to distinguish between malware and benign files. As another example, models according to related art may be trained/developed.

A system, method, and/or device for predicting or determining whether to re-train a model is disclosed. The system includes one or more processors and a memory coupled to the one or more processors and configured to provide the one or more processors with instructions. The one or more processors are configured to analyze a set of data in connection with detecting a temporal drift, determine that a resultant stationary series has changed from training data, and automatically update the machine learning model in response to determining that the resultant stationary series has changed. The machine learning model is trained based at least in part on a set of training data.

According to various embodiments, the machine learning model (e.g., the model) is determined to be re-trained in response to determining that a set of data with respect to which the model is applied has temporally drifted in relation to the training data (e.g., the set of data used to train the model). For example, the system determines a change, or extent of the change, between the set of data respect to which the model is applied (e.g., current data) and the training data (e.g., historical data). The training data may be an initial set of data used to train a model, or a set of data used to re-train the model (e.g., in response to detection of a previous temporal drift).

In some embodiments, the system obtains the set of data with respect to which the model is applied and determines whether to update the model based at least in part on the set of data. The system may process the set of data to obtain time series data, and compare the time series data with the training data to determine a difference (e.g., a change) between the time series data and the training data. In some embodiments, the system determines whether an extent of the difference or change exceeds a preset change threshold (e.g., a statistical threshold). As an example, the preset change threshold may be three standard deviations such as three standard deviations from the training data. As another example, the preset change threshold may be four standard deviations. Various other statistical measures may be implemented as the preset change threshold.

Machine learning models may be used to provide real-time analysis of information. For example, security devices may use machine learning models to provide real-time detection (or prediction) of malicious traffic, malicious files, or malicious domains, etc. Various other applications of using time-series data in connection with model predictions may be implemented, such as in connection with firewall log analysis to proactively detect anomalies, etc. However, the statistical characteristics of such data used by models to provide anomaly detection or prediction may change (e.g., shift) over time. Accordingly, to continue to provide accurate predictions, the model is updated as the statistical characteristics of the data used by the model to provide detection or prediction changes. The phenomenon of the change in the statistical characteristics of the data used by the model is called temporal data drift or concept drift. In some related art, models are retrained at predetermined intervals. In some related art, models are retrained in response to a manual instruction provided by an administrator. An easier way is to retrain the model with updated data when the accuracy of the model is noticeably degrading. However, such methods of retraining models when the accuracy of such is noticeably degrading rely on the availability of the ground truth, which is rarely fulfilled in practical applications. Accordingly, there is a need for efficient ways to detect temporal drift or concept drift in the unsupervised time series data and subsequently adapt the models to the concept drift for better generalization.

According to various embodiments, the system detects temporal drift or concept drift in the unsupervised time series data and automatically updates the models based at least in part on the detected temporal drift or concept drift. In some embodiments, the system dynamically updates the model in response to detecting the temporal drift or concept drift. The system may monitor (or analyze) the set of data used by the models at predetermined intervals and assess (e.g., determine) whether temporal drift or concept drift has occurred with respect to the set of data used by the models. For example, the system may determine whether temporal drift or concept drift has occurred daily (e.g., at midnight or another time when the models are not accessible for queries or when traffic is low). Various other predetermined intervals may be implemented, including weekly, monthly, every other day, etc.

In some embodiments, the system detects temporal drift or concept drift in response to determining that an extent of a change between the set of data used by the model (e.g., the unsupervised time series data) and the data used to train the model (e.g., the training data) satisfies one or more criteria. For example, temporal drift or concept drift is deemed to occur in response to determining that the extent of the change is greater than one or more predetermined change thresholds (e.g., a statistical threshold). In some embodiments, the model is updated based on the change in the set of data only in response to the update being triggered by detection of temporal drift of the set of data.

According to various embodiments, the system obtains a set of data with respect to which a model is to be applied to provide a prediction (e.g., a detection of an anomaly, etc.). In response to obtaining the set of data, the set of data is pre-processed in connection with detecting whether temporal drift has occurred. In some embodiments, the pre-processing the data includes converting the set of data to stationary data, removing a subset of the stationary data, fitting a seasonal component of the stationary data to time series data, and removing seasonal data from the stationary data to obtain the resultant stationary series. For example, the pre-processing the data includes de-seasonalizing the set of data (e.g., removing a seasonal component from the set of data).

According to various embodiments, the converting the set of data to stationary data (e.g., to make the time series data stationary) includes using the Augmented Dickey-Fuller process/test to make the set of data stationary. A set of previous observations may be subtracted from current observations. For example, the determination of whether temporal drift has occurred with respect to the set of data used by the model is more computational intensive the longer then period of time for which time series data corresponds. In some embodiments, the data corresponding to observations that occurred a predetermined period of time in the past (e.g., the previous observations) are removed from the data used for detection of whether temporal drift has occurred. In some embodiments, the predetermined period of time in the past is 4 days. Various other time intervals may be used for the predetermined period of time, such as 12 hours, 3 days, 5 days, 7 days, 14 days, a month, a year, etc.

According to various embodiments, the fitting a seasonal component of the stationary data to time series data includes using a boosted embeddings process/model to fit a seasonal component to time series data. The boosted embeddings process/model is further described in Karingula, S. R., et al. 2021. Boosted Embeddings for Time Series Forecasting. Lecture Notes in Computer Science (LNCS), the entirety of which is hereby incorporated herein for all purposes. The boosted embeddings process/model may employ gradient boosting of deep models with embedding in the context of time-series forecasting. As an example, the boosted embedding process/model executes a loop wherein at each iteration embeddings are added for each model, the previous embeddings are frozen, and keep growing the networks. In the end, the model solves (e.g., only solves) the residual model, which can be solved by gradient boosting, DNN, or any other method. The system leverages embeddings to learn (e.g., determine) seasonality (e.g., hourly, daily, weekly, monthly, yearly) or unknown cycles by multiple categorical features. For example, assuming $\Theta^T$ is used to capture $$f^m = [e_1^m, \ldots e_L^m, r^m]$$

where $e_i$, $i=1, \ldots, L$ are embedding models to capture categorical data and r represents the residual model. According to various embodiments, the boosted embeddings process/model is represented by an algorithm such as the following algorithm:

```
function BOOSTED.EMBEDDINGS (X,N)
    where X = ((t_n,y_n))_{n=1}^N
    f^m = [ ]
    F_0 := y
    for 1 ≤ l ≤ L + 1: do          /iteration over the embedding models
        e_l, fit(t, F_{l-1})         /fitting the selected embedding model
        F_l = F_{l-1} − elpredict(t)  /residual computation
        if |F_l − F_{l-1}| < ε : then  /check termination condition
            break
        end if
        f^m.appen(e_l)
    end for
    return f_m
end function
```

According to various embodiments, the detection of temporal drift process/model is represented by an algorithm such as the following algorithm:

```
function UNSUPERVISED.TEMPORAL.DRIFT.DETECTOR(X,N)
    where X = [X_1, X_2, ..., X_n = N] such that X_i ∈ ℝ , X_i is the data point at time t
    k = NDIFFS(X, max.dif f = 4, test = "adf")   /get min # of differences
                                                   estimates required to make a
                                                   time series stationary
    X = X.diff(k)
    P = BOOSTED.EMBEDDINGS(X,N)                    /Fit boosted embeddings to
                                                   Seasonality +
                                                       additional categorical variables
    Error = X − P                                  /compute residual
    ZScoreCurr = ComputeZScore(Error)
    return ZScoreCurr
end function
``` time-categorical features (e.g., months of the year, days of the week, hours of the day, etc.), and $\Theta^I$ is used to represent other independent categorical features, then the m-th model can be formulated as:

$$f^m := f_{emb}^m(x; \theta_m^T, \theta_m^I) + f_{res}^m(x)$$

where $f_{emb}$ is the embedding model and $f_{res}$ is a residual model.

According to various embodiments, the boosted embeddings process/model leverages the DeepGB algorithm, where gradient boosting trains several simple models sequentially. The boosted embeddings process/model may be constructed such that each subsequent model trains only the difference of the output and the previous model to leverage each model's strengths and minimize the regression error. The boosted embeddings process/model employs a loop wherein with each iteration, the previous embeddings are frozen and new embeddings are added to models such that:

In some embodiments, the obtaining the minimum number of differences is implemented using Augmented Dickey-Fuller Functions to estimate the number of differences required to make a given time series stationary. The boosted embeddings process/model enables the system to learn from the distinct time series signature at once by encoding the categorical features in a meaningful way (e.g., linear time, weekday or weekend effect, holiday effect, user defined exogenous categorical variables, etc.) in a lower dimension space to extract valuable information. A residual is computed (e.g., Error) by removing the seasonal component from the raw data X (e.g., the obtained set of data). A Z-score is computed with respect to the residual (e.g., the resultant stationary series) in connection with determining whether the Z-score has changed from the Z-score of the training data used to train the model.

Related art systems use simply statistical approaches to detect drift in a set of data. For example, related art systems merely compute the mean and standard deviation of the set of data and compare such mean and standard deviation to the mean and standard deviation of the training data. Such comparison is used to detect whether the set of data exhibits drift. Although such a drift detection technique is computationally efficient, such technique is extremely inaccurate when applied to time series data with seasonality.

The system improves detection (or predictions) using machine learning models. The system improves the accuracy of the models based at least in part on dynamically updating (e.g., retraining) the models in response to detection of temporal drift. In addition, the system improves the efficiency and allocation of resources based on the updating the models in response to detection of the temporal drift. Retraining a model is expensive such as in terms of requiring significant compute resources and significant time. The system may save from incurring resources to retrain a model when the underlying data used by the model has not shifted in a meaningful manner (e.g., when temporal drift has not occurred).

FIG. 1 is a block diagram of an environment in which temporal drift of data corresponding to a model is detected according to various embodiments.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within (or from coming into) enterprise network 110.

Data appliance 102 can be configured to work in cooperation with a remote security platform 140. Security platform 140 can provide a variety of services, including performing static and dynamic analysis on malware samples, providing a list of signatures of known-malicious files to data appliances, such as data appliance 102 as part of a subscription, identifying malicious domains, detecting newly registered domains, predicting whether a newly registered domain is malicious, providing an indication of malicious domains (e.g., an indication that a newly registered domain is malicious), identifying malicious traffic or file, detecting malicious traffic, predicting whether a file is malicious, etc. In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

According to various embodiments, security platform 140 comprises various modules for detecting malicious traffic, files, and/or domains. According to various embodiments, the various modules for detecting malicious traffic, files, and/or domains use machine learning models in connection with detecting (e.g., predicting) whether traffic, a file, and/or a domain is malicious, or to otherwise detect an anomaly. For example, security platform 140 comprises DNS tunneling detector 138. As another example, security platform 140 comprises machine learning (ML) model updater 170.

According to various embodiments, ML model updater 170 is used in connection with dynamically updating one or more models in response to determining that a set of data exhibits temporal drift in relation to training data used to train the one or more models. ML model updater 170 obtains a set of data, processes the set of data to determine a resultant stationary series, and determine whether a resultant stationary series has changed from training data. In some embodiments, ML model updater 170 automatically update the machine learning model in response to determining that the resultant stationary series has changed. ML model updater 170 obtains a set of data at predetermined times or time intervals, and uses the set of data to determine whether a temporal drift has occurred in relation to the training data.

In some embodiments, ML model updater 170 comprises one or more series data determiner 172, temporal drift detector 174, re-training module 176, and/or cache 178.

Series data determiner 172 is used in connection with pre-processing the set of data obtained by ML model updater 170 such as for temporal drift detector 174 to determine whether temporal drift has occurred. In some embodiments, series data determiner 172 uses the set of data to determine the resultant stationary series (e.g., the resultant stationary series is analyzed by temporal drift detector 174 to determine whether the set of data exhibits temporal drift). In some embodiments, series data determiner 172 pre-processes the data to convert the set of data to stationary data, remove a subset of the stationary data, fit a seasonal component of the stationary data to time series data, and remove seasonal data from the stationary data to obtain the resultant stationary series. For example, series data determiner 172 processes the set of data to de-seasonalizing the set of data (e.g., removing a seasonal component from the set of data).

According to various embodiments, series data determiner 172 converts the set of data to stationary data (e.g., to make the time series data stationary) based at least in part on using the Augmented Dickey-Fuller process/test to make the set of data stationary. Series data determiner 172 may subtract a set of previous observations from current observations. For example, series data determiner 172 subtracts a set of observations deemed to be trivial from the current observations, such as in connection with determining a set of data that is better suited for computation (e.g., to remove stale observations and to reduce a number of observations because a large number of observations can cause the processing of such data to be computationally burdensome). Series data determiner 172 may subtract from (e.g., remove from) the set of data a subset of data corresponding to observations that occurred a predetermined period of time in the past (e.g., the previous observations). In some embodiments, the predetermined period of time in the past is 4 days. Various other time intervals may be used for the predetermined period of time, such as 12 hours, 3 days, 5 days, 7 days, 14 days, a month, a year, etc.

In some embodiments, series data determiner 172 determines the resultant stationary series based at least in part on fitting a seasonal component of the stationary data to time series data, and removing a seasonal component form the stationary data. As an example, series data determiner 172 determines a seasonal component based at least in part on a boosted embeddings process/model. For example, series data determiner 172 fits the seasonal component to the time series data using the boosted embeddings process/model. In some embodiments, series data determiner 172 uses embeddings to learn (e.g., determine) seasonality (e.g., hourly, daily, weekly, monthly, yearly) or unknown cycles by multiple categorical features. For example, assuming $\Theta^T$ is used to capture time-categorical features (e.g., months of the year, days of the week, hours of the day, etc.), and $\Theta^I$ is used to represent other independent categorical features, then the m-th model can be formulated as:

$$f^m := f^m_{emb}(x; \theta^T_m, \theta^I_m) + f^m_{res}(x)$$

where $f_{emb}$ is the embedding model and $f_{es}$ is a residual model. According to various embodiments, the residual model corresponds to the resultant stationary data used in connection with determining whether temporal drift occurred.

In response to series data determiner 172 obtaining (e.g., determining) the resultant stationary data, ML model updater 170 provides the resultant stationary data to temporal drift detector 174. ML model updater 170 uses temporal drift detector 174 in connection with determining whether temporal drift has occurred in the data used by the model (e.g., a temporal drift in relation to the training data used to train the model).

In some embodiments, temporal drift detector 174 compares the time series data (e.g., the resultant stationary data) with the training data to determine a difference (e.g., a change) between the time series data and the training data. In some embodiments, temporal drift detector 174 determines whether an extent of the difference or change exceeds a preset change threshold (e.g., a statistical threshold). For example, temporal drift or concept drift is deemed to occur in response to determining that the extent of the change is greater than one or more predetermined change thresholds (e.g., a statistical threshold). As an example, a preset change threshold may be three standard deviations such as three standard deviations from the training data. As another example, the preset change threshold may be four standard deviations. Various other statistical measures may be implemented as the preset change threshold.

According to various embodiments, temporal drift detector 174 determines whether temporal drift occurred based at least in part on determining a Z-score corresponding to the set of data (e.g., the resultant stationary data). Temporal drift detector 174 uses the Z-score corresponding to the set of data to determine whether temporal drift occurred, such as by determining whether one or more change thresholds are satisfied (e.g., exceeded). In some embodiments, temporal drift detector 174 compares the Z-score corresponding to the set of data (e.g., the resultant stationary data) to a Z-score corresponding to stationary data.

In response to temporal drift detector 174 determining whether temporal drift occurred, ML model updater 170 provides an indication of whether to update (e.g., retrain) one or more corresponding ML models based at least in part on whether temporal drift occurred. In some embodiments, in response to receiving an indication that temporal drift occurred with respect to a set of data used by a model (e.g., to provide a prediction/estimate), re-training module 176 determines to update the corresponding model (or ML model updater 170 instructs re-training module 176 to update the model).

According to various embodiments, in response to determining that an extent of a change between a set of data obtained and training data for a model, re-training module 176 is re-trained based at least in part on the obtained set of data (e.g., a current set of observations or observations that over a predetermined time such as observations over the past four days, etc.). In some embodiments, in response to re-training the model(s), re-training module 176 provides the model to a service for deployment. For example, the model is provided to security platform 140 for deployment to provide anomaly detection (e.g., detection/prediction of malicious files, traffic, and/or domains). As another example, the model (e.g., the updated/re-trained model) is stored in cache 178. As another example, the model is provided to a security entity such as a firewall for deployment.

Cache 178 stores information pertaining to a model, such a training data, statistical information pertaining to a model or data used in deployment (e.g., the obtained set of data, the training data, etc.). As an example, cache 178 stores Z-scores characterizing one or more sets of data, resultant stationary data obtained based at least in part on processing an obtained set of data, etc. In some embodiments, cache 178 stores mappings of indications of whether a model is to be updated to models. Cache 178 may store additional information pertaining to a set of models such as features used by the models, applications for the models, predictions or estimates provided by the model, historical information pertaining to the model (e.g., past predictions, past responses to queries, etc.).

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/ harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjqfeuo32y1hkjshdflu23.badsite.com, where the sub-domain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Detecting and preventing DNS tunneling attacks is difficult for a variety of reasons. Many legitimate services (e.g., content delivery networks, web hosting companies, etc.) legitimately use the subdomain portion of a domain name to encode information to help support use of those legitimate services. The encoding patterns used by such legitimate services can vary widely among providers and benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious domains can efficiently and proactively be detected (e.g., shortly after registration of a domain), and security policies may be enforced with respect to traffic for malicious domains, such as to block traffic to/from such malicious domains.

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32y1hkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

According to various embodiments, security platform 140 is used to detect anomalies such as malicious files, malicious traffic, and/or malicious domains. In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), it provides them to security platform 140 which performs both anomaly detection and similarity detection, respectively. In various embodiments, a domain (e.g., as provided in a query received by security platform 140) is classified as a malicious DNS tunneling root domain if either detector flags the domain.

In some embodiments, security platform 140 provides to a security entity, such as data appliance 102, an indication whether an anomaly is detected such as an indication of whether a file is malicious, an indication that traffic is malicious, an indication that a domain is malicious, etc. According to various embodiments, security platform 140 uses (e.g., deploys) one or more models for detection of anomalies. The one or more models are updated based at least in part on ML model updater 170. For example, in response to determining that the domain is malicious, security platform 140 sends an indication that the domain is malicious to data appliance 102, and the data appliance may in turn enforce one or more security policies based at least in part on the indication that the newly registered domain is malicious. As another example, in response to determining that a domain is malicious, security platform 140 provides to the security entity an update of a mapping of domains to indications of whether a corresponding domain is malicious, or an update to a blacklist for malicious domains (e.g., identifying malicious domains) or a whitelist for benign domains (e.g., identifying domains that are not deemed malicious).

Figure 2:
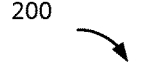
FIG. 2 is a block diagram of a system to re-train a model based on a temporal drift of data corresponding to the model corresponding to the model according to various embodiments.

FIG. 2 is a block diagram of a system to re-train a model based on a temporal drift of data corresponding to the model corresponding to the model according to various embodiments. According to various embodiments, system 200 is implemented in connection with system 100 of FIG. 1, such as for ML model updater 170, and/or system 400 of FIG. 4. In various embodiments, system 200 is implemented in connection with determining time series model 300 of FIG. 3A, a residual model 350 of FIG. 3B such as a resultant stationary data. In various embodiments, system 200 is implemented in connection with process 500 of FIG. 5, process 600 of FIG. 6, process 700 of FIG. 7, and/or process 800 of FIG. 8.

System 200 can be implemented by one or more devices such as servers. System 200 can be implemented at various locations on a network. For example, the ML model updater 170 of system 100 of FIG. 1 is deployed as a service, such as a web service. The service may be provided by a security platform (e.g., the ML model updater is deployed on a remote server that monitors set of data such as observations, determines whether the sets of data exhibit temporal drift for the models that use such set of data to determine predictions, and sends/pushes out notifications or updates pertaining to models such as an indication whether a model is to be updated, or an updated/re-trained model). As another example, the ML model updater is deployed on a firewall.

According to various embodiments, system 200 detects temporal drift or concept drift in the unsupervised time series data and automatically updates the models based at least in part on the detected temporal drift or concept drift. In some embodiments, system 200 dynamically updates the model in response to detecting the temporal drift or concept drift. System 200 monitors (or analyzes) the set of data used by the models at predetermined intervals and assesses (e.g., determine) whether temporal drift or concept drift has occurred with respect to the set of data used by the models. For example, system 200 determines whether temporal drift or concept drift has occurred daily (e.g., at midnight or another time when the models are not accessible for queries or when traffic is low). Various other predetermined intervals may be implemented, including weekly, monthly, every other day, etc.

In the example shown, system 200 implements one or more modules in connection with whether a model is to be updated/re-trained. System 200 comprises communication interface 205, one or more processors 210, storage 215, and/or memory 220. One or more processors 210 comprises one or more of communication module 225, series data module 230, seasonal data modification module 235, drift detector module 240, re-training module 245, and/or notification module 250.

In some embodiments, system 200 comprises communication module 225. System 200 uses communication module 225 to communicate with various nodes or end points (e.g., client terminals, firewalls, DNS resolvers, data appliances, other security entities, model prediction services, etc.) or user systems such as an administrator system. For example, communication module 225 provides to communication interface 205 information that is to be communicated. Communication module 235 obtains information pertaining to occurrences (e.g., information for occurrences that occur over a predetermined period of time, a set of data, etc.). As another example, communication interface 205 provides to communication module 225 information (e.g., the obtained set of data) received by system 200. Communication module 225 is configured to query third party service(s) (e.g., services that expose raw data used by one or models such as in connection with providing predictions/estimates) for a set of data. For example, system 200 may use communication module 225 to query the third party service(s). Communication module 225 is configured to receive one or more settings or configurations from an administrator. Examples of the one or more settings or configurations include configurations of a model (e.g., the machine learning model), an indication of a training set for the model (e.g., the training data used to train a model), an indication of a set of features used by a model in connection with providing predictions/estimates, etc.

In some embodiments, system 200 comprises series data module 230. System 200 uses series data module 230 in connection with receiving time series data such as raw data pertaining to a set of occurrences. Series data module 230 queries one or more modules/services for the time series data according to a predetermined interval. For example, series data module 230 monitors (or analyze) the set of data used by the models at predetermined intervals and provides such set of data to seasonal data modification module 235 to process such data before drift detector module 240 is used to assess (e.g., determine) whether temporal drift or concept drift has occurred with respect to the set of data used by the models. As an example, the predetermined interval that series data module 230 monitors (e.g., obtains) the set of data used by the models is daily. Various other predetermined intervals may be implemented, including weekly, monthly, every other day, etc. In some embodiments, system 200 determines whether temporal drift or concept drift has occurred daily (e.g., at midnight or another time when the models are not accessible for queries or when traffic is low). In some embodiments, series data module 230 obtains the set of data used by the models from a customer, such as an entity for which a model is deployed to provide predictions/ estimates. As an example, the customer is an entity for which security platform 140 is deployed to provide anomaly detection as a service.

According to various embodiments, series data module 230 processes the set of data used by the models (e.g., to provide predictions, etc.) to remove information deemed trivial. For example, series data module 230 processes the set of data to remove stale data or data that is deemed to cause the computation of temporal drift to be burdensome/ inefficient (e.g., a subset of data for which the value obtained by including in the computation of temporal drift is deemed outweighed by the computational burden incurred by such inclusion of the data in computing the temporal draft). As an example, a set of previous observations is subtracted/re-moved from the set of data to obtain set of data correspond-ing to current observations (e.g., observations over the predetermined time). In some embodiments, series data module 230 processes the set of data used by the models to include occurrences for the past four days or other such predetermined period of time. The predetermined period of time may be set by an administrator. Various other time intervals may be used for the predetermined period of time, such as 12 hours, 3 days, 5 days, 7 days, 14 days, a month, a year, etc.

In some embodiments, system 200 comprises seasonal data modification module 235. System 200 uses seasonal data modification module 235 to fit a seasonal component to the set of data (e.g., the set of data corresponding to the current observations). System 200 further uses seasonal data modification module 235 to remove the remove the seasonal component to obtain the resultant stationary data. For example, seasonal data modification module 235 de-season-alizing the set of data. According to various embodiments, seasonal data modification module 235 uses a boosted embeddings process/model to fit a seasonal component to time series data. For example, the boosted embeddings process/model uses gradient boosting of deep models with embedding in the context of time-series forecasting. As an example, the boosted embedding process/model executes a loop wherein at each iteration embeddings are added for each model, the previous embeddings are frozen, and keep growing the networks. The boosted embeddings process/ model solves (e.g., only solves) the residual model, which can be solved by gradient boosting, DNN, or any other method. The system leverages embeddings to learn (e.g., determine) seasonality (e.g., hourly, daily, weekly, monthly, yearly) or unknown cycles by multiple categorical features.

According to various embodiments, in response to deter-mining the resultant stationary data (e.g., the residual model after using the boosted embeddings process/model to fit the seasonal component and removal of the seasonal compo-nent), system 200 determines whether temporal drift has occurred (e.g., whether the resultant stationary data exhibits temporal drift). For example, system 200 provides the resultant stationary data to drift detector module 240 in connection with determining whether temporal drift occurred.

In some embodiments, system 200 comprises drift detec-tor module 240. System 200 uses drift detector module 240 to determine whether temporal drift occurred. Drift detector module 240 compares the set of data obtained by system 200 (e.g., the set of data pre-processed by system 200 such as by series data module 230 and/or seasonal data modification module 235) to training data used to train a model. For example, drift detector module 240 compares the resultant stationary data and the training data such as to determine a difference (e.g., a change) between the resultant stationary data and the training data. Determining the difference between the resultant stationary data and the training data comprises determining an absolute difference and/or one or more attributes pertaining to a statistical difference. In some embodiments, drift detector module 240 determines whether an extent of the difference or change exceeds a preset change threshold (e.g., a statistical threshold). As an example, the preset change threshold may be three standard deviations such as three standard deviations from the training data. As another example, the preset change threshold may be four standard deviations. Various other statistical measures may be implemented as the preset change threshold.

In some embodiments, drift detector module 240 detects temporal drift or concept drift in response to determining that an extent of a change between the set of data used by the model (e.g., the unsupervised time series data) and the data used to train the model (e.g., the training data) satisfies one or more criteria. For example, temporal drift or concept drift is deemed to occur in response to determining that the extent of the change is greater than one or more predetermined change thresholds (e.g., a statistical threshold). In some embodiments, system 200 updates the model based on drift in the set of data (e.g., the set of data used in deployment of the model) only in response to the update being triggered by detection of temporal drift of the set of data.

According to various embodiments, system 200 deter-mines to update/re-train the model in response to determin-ing that drift detector module 240 detected temporal drift (or concept drift) in the set of data used by the model (e.g., in relation to the training data used to train the model). In some embodiments, system 200 automatically updates/re-trains the model (or automatically causes the model to be updated/ re-trained, such as by re-training module 245) in response to detection of the temporal drift of the set of data used by the model. For example, system 200 provides an indication to update/re-train the model to re-training module 245 in response to drift detector module 240 detecting temporal drift (or concept drift) in the set of data used by the model.

In some embodiments, system 200 comprises re-training module 245. System 200 uses re-training module 245 in to update (e.g., re-train) a model. In some embodiments, in response to drift detector module 240 detecting a temporal drift (or concept drift) in the set of data used by the model, system 200 uses re-training module 245 to automatically and/or dynamically update the model. As an example, re-training module 245 updates the model based at least in part on the set of data (e.g., a set of data corresponding to current occurrences, current data, etc.). For example, the model is updated based at least in part on the resultant stationary data. As another example, in response to drift detector module 240 detecting temporal drift (or concept drift) in the set of data used by the model, re-training module 245 provides an update indication/instruction to a model service that main-tains/manages models. The update indication/instruction provided to the model service is used to invoke the model service to re-train/update the model. For example, the update indication/instruction is provided to the model service in connection with the resultant stationary data (e.g., which is used to re-train the model). In some embodiments, the model service is provided by system 200 or by another device such as a server. As an example, security platform 140 of system 100 of FIG. 1 may provide the model service. As another example, the model service is provided by a third party service and system 200 queries the model service to cause the model to be retrained. System 200 may communicate with the model service via an application programming interface (API).

In some embodiments, system 200 comprises notification module 250. System 200 uses notification module 250 to provide an indication of whether the temporal drift is detected and/or an indication of whether the model is to be updated/re-trained. For example, notification module 250 obtains an indication of whether the model is to be re-trained from system 200 (e.g., re-training module 245) and provides the indication of whether the model is to be updated (e.g., an instruction to update the model) such as to a model service that maintains/manages one or more models (e.g., a module (not shown) of system 200, or a service provided by a device such as a server, etc.).

According to various embodiments, storage 215 comprises one or more of filesystem data 260, model data 262, and/or cache data 264. Storage 215 comprises a shared storage (e.g., a network storage system) and/or database data, and/or user activity data.

In some embodiments, filesystem data 260 comprises a database such as one or more datasets (e.g., one or more datasets for deployment of models, such as a set of data corresponding to current occurrences, resultant stationary data, etc.). Filesystem data 260 comprises data such as a dataset for training a model (e.g., the training data), features used by the model to provide a prediction/estimate, etc.

Model data 262 comprises data pertaining to one or more models. As an example, data pertaining to one or more models comprises relationships and associations between one or more attributes or characteristics (e.g., an attribute/characteristic of traffic, a file, a domain, etc.) and an indication of an anomaly. Model data 262 can store information pertaining to one or more machine learning models and/or configurations for the implementation of one or more machine learning models to detect anomalies and/or provide predictions such as in response to a query (e.g., a query from a customer, security entity, etc.).

Cache data 264 comprises information pertaining to pre-processed data, resultant stationary data, etc.

According to various embodiments, memory 220 comprises executing application data 270. Executing application data 270 comprises data obtained or used in connection with executing an application such as an application executing a machine learning process or for configuring a machine learning model. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious traffic, a document preparation application, a report preparation application, a user interface application, a data analysis application, an anomaly detection application, a user authentication application, a security policy management/update application, etc.).

Figure 3A:
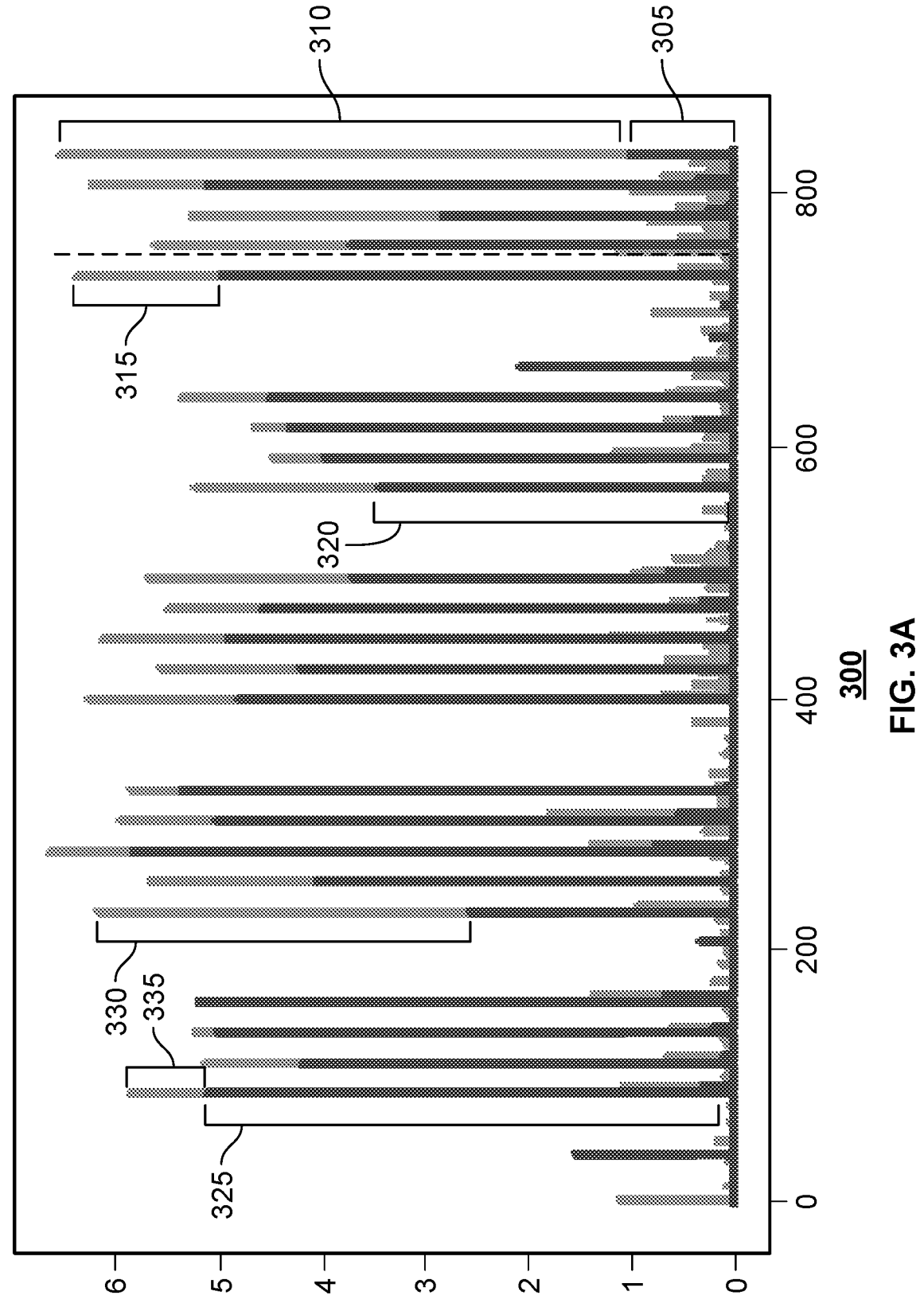
FIG. 3A is a graph illustrating detection of temporal drift according to various embodiments.

FIG. 3A is a graph illustrating detection of temporal drift according to various embodiments. According to various embodiments, time series model 300 illustrated in FIG. 3A is generated using boosted embeddings process/model to fit a seasonal component to time series data. The boosted embeddings process/model may employ gradient boosting of deep models with embedding in the context of time-series forecasting. As an example, the boosted embedding process/model executes a loop wherein at each iteration embeddings are added for each model, the previous embeddings are frozen, and keep growing the networks. In the end, the model solves (e.g., only solves) the residual model, which can be solved by gradient boosting, DNN, or any other method.

As illustrated in FIG. 3A, time series model comprises a plurality of non-seasonal components and a plurality of seasonal components. Examples of the non-seasonal components include 305, 320, and 325. Examples of the seasonal components include 310, 315, 330, and 335. In some embodiments, the plurality of seasonal components are subtracted from the time series model 300 to obtain the resultant stationary data (e.g., the residual model).

Figure 3B:
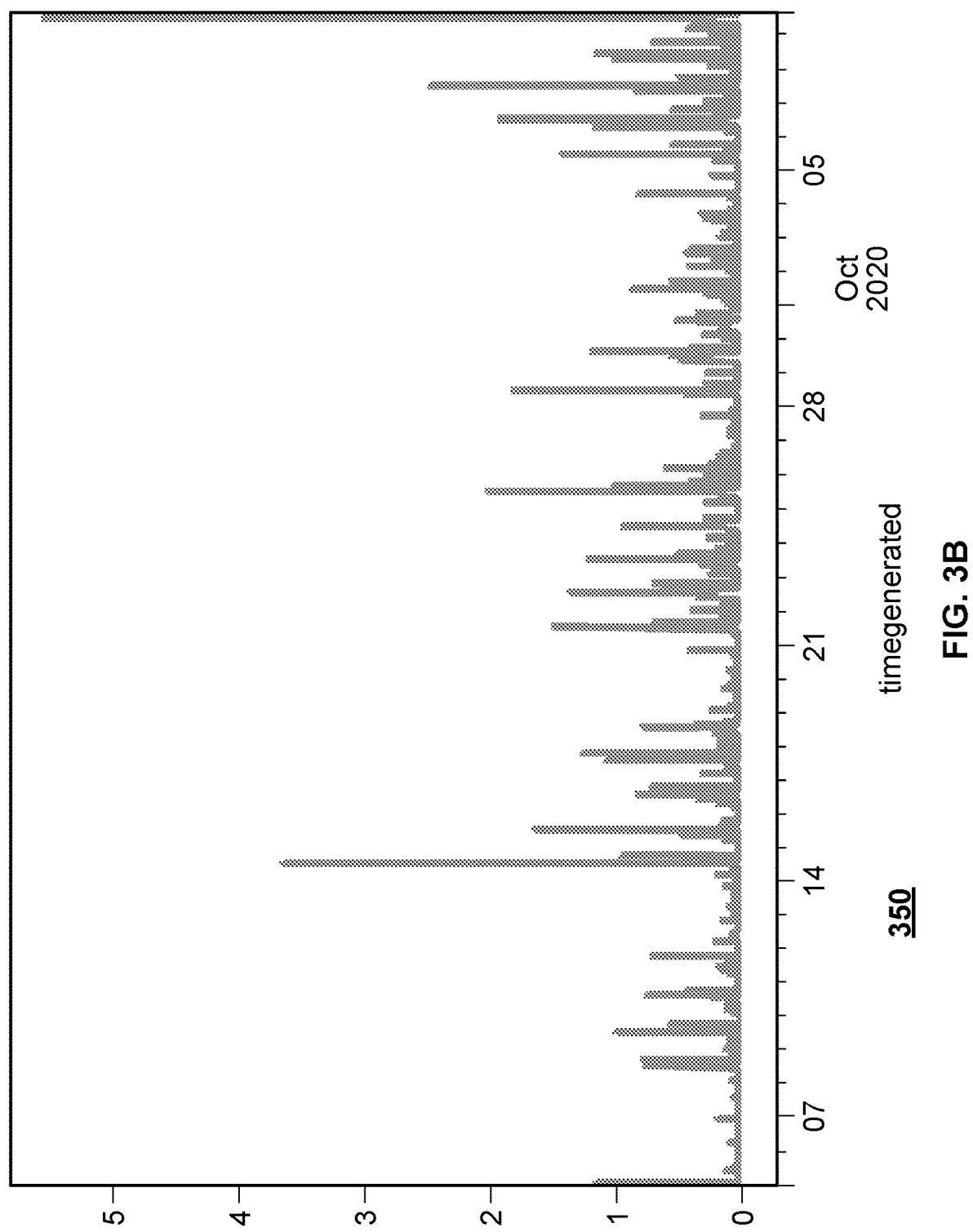
FIG. 3B is a graph illustrating time series data according to various embodiments.

FIG. 3B is a graph illustrating time series data according to various embodiments. According to various embodiments, time series model 350 illustrated in FIG. 3B is generated using boosted embeddings process/model to fit a seasonal component to time series data and removing a seasonal component from the time series data. For example, time series model corresponds to time series model 300 of FIG. 3A further modified to subtract/remove the seasonal component. In other words, time series model 350 corresponds to the residual model (e.g., the resultant stationary model) obtained using time series model 300.

Figure 4:
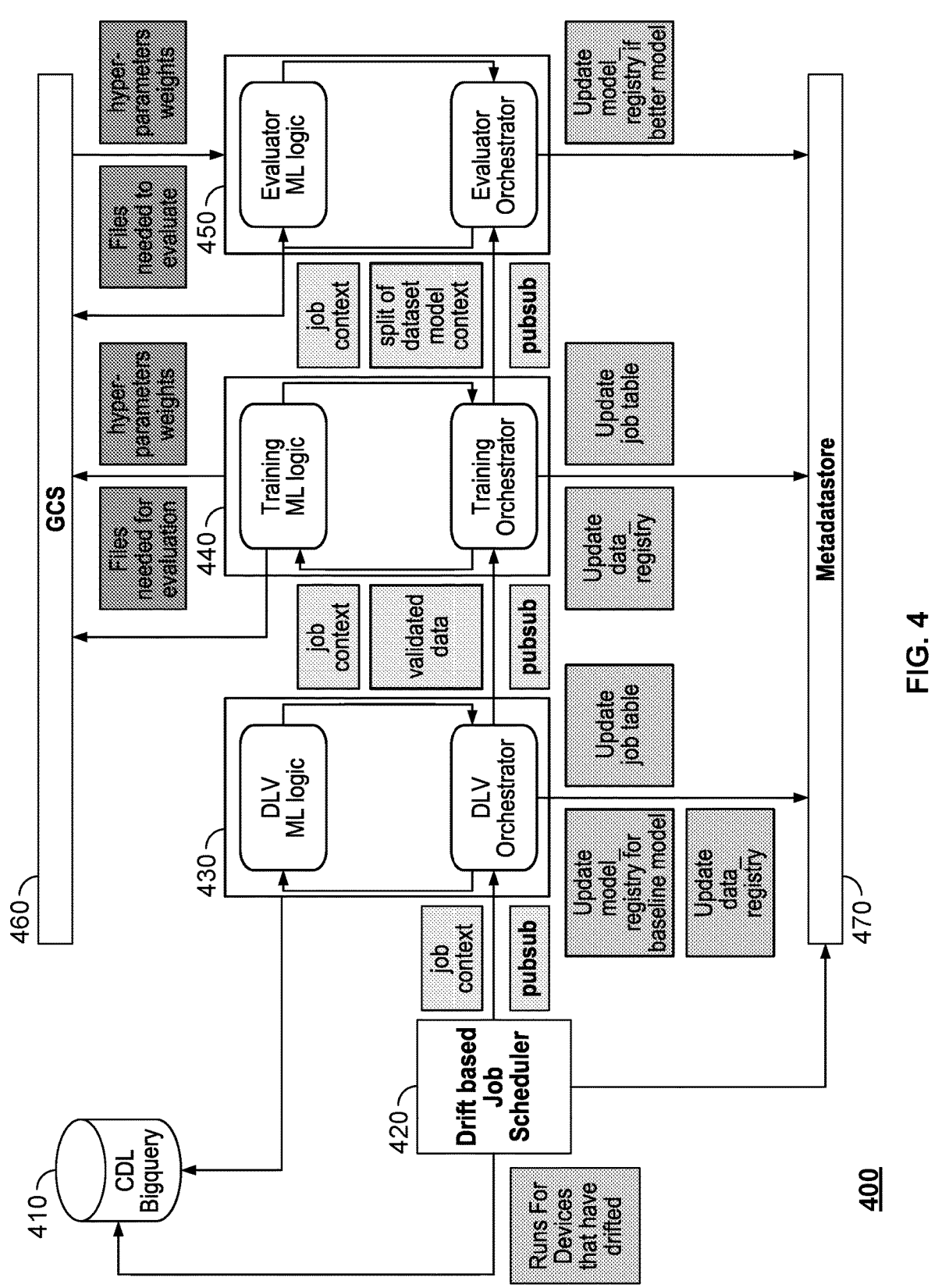
FIG. 4 is a block diagram of a system to re-train a model according to various embodiments.

FIG. 4 is a block diagram of a system to re-train a model according to various embodiments. According to various embodiments, system 400 is implemented in connection with system 100 of FIG. 1, such as for a model service that trains models, and/or system 200 of FIG. 2, such as for re-training module 245 or a model service invoked to re-train a model. In various embodiments, system 400 is implemented in connection with process 500 of FIG. 5, process 600 of FIG. 6, and/or process 800 of FIG. 8.

System 400 comprises one or more of data store 410, job scheduler 420, Data Loader and Validator (DLV) module 430, training module 440, evaluator module 450, cloud service module 460, and/or metadata store 470.

In some embodiments, job scheduler 420 implements system 200 of FIG. 2 and/or ML model updater 170 of system 100 of FIG. 1. In some embodiments, job scheduler 420 interfaces system 200 of FIG. 2 and/or ML model updater 170 of system 100 of FIG. 1. For example, job scheduler 420 receives an indication that a particular model is to be retrained and/or the resultant stationary data (or an identifier or pointer associated with the resultant stationary data or corresponding set of data, etc.).

According to various embodiments, job scheduler 420 determines a set of one or more models that are to be updated (e.g., re-trained) based at least in part on detection of temporal drift with respect to the set(s) of data used by the set of one or more models. In response to determining that the set of one or more models are to be updated, job scheduler 420 invokes a job to update/re-train the set of one or more models. For example, job scheduler 420 iterates through the set of one or more models to re-train each model in the set of one or more models. In some embodiments, job scheduler determines the set of one or more models that are to be updated (e.g., re-trained) at predetermined times or time intervals and/or invokes the updating/re-training of the set of one or more models. As an example, job scheduler 420 is a cron job that wakes up daily (e.g., every midnight or at another preset time when compute resources are not in high demand, etc.) and determines whether temporal drift has occurred with respect to the set(s) of data used by the set of one or more models (or invokes such a determination), and/or determines set of one or more models that are to be updated (e.g., re-trained) based at least in part on detection of temporal drift with respect to the set(s) of data used by the set of one or more models.

System 400 uses DLV module 430 to read the corresponding data from data store 410 in response to a determination by job scheduler 420 that a set of models are to be re-trained/updated. For example, in response to job scheduler 420 invoking a job to re-train/update a model, DLV module 430 obtains the corresponding set of data from data store 410. DLV module 430 is used to pre-process the corresponding set of data before such data is used to re-train/update the model. For example, DLV module 430 performs one or more of data validation, cleaning, aligning data for jitters, removing Not a Numbers (NaNs), cleaning up for duplicates, handling gaps using interpolation, etc.

In response to validation by DLV module 430, the set of data is provided to training module 440. System 400 uses training module 440 to re-train/update the model based at least in part on the set of data (e.g., the data validated by DLV module 430). Training module 440 may use data stored in metadata store 470 in connection with training the model. In response to the model being re-trained/updated, the model is provided to evaluator module 450. Evaluator module 450 assesses the model to determine whether the model is suitable for deployment. In some embodiments, evaluator module 450 computes reconstruction score of the current model on current data with the previously deployed model (e.g., the model being re-trained/updated) on current data. If the current model performs better than the previously deployed model and/or better than a predetermined performance threshold (e.g., an accuracy threshold, etc.), the current model is deployed. For example, the model is published (e.g., deployed) to cloud service module 460. In some embodiments, if the current model does not perform better than the previously deployed model, or if the current model performs less than the predetermined performance threshold, the current model is not deployed, and another model is trained.

Figure 5:
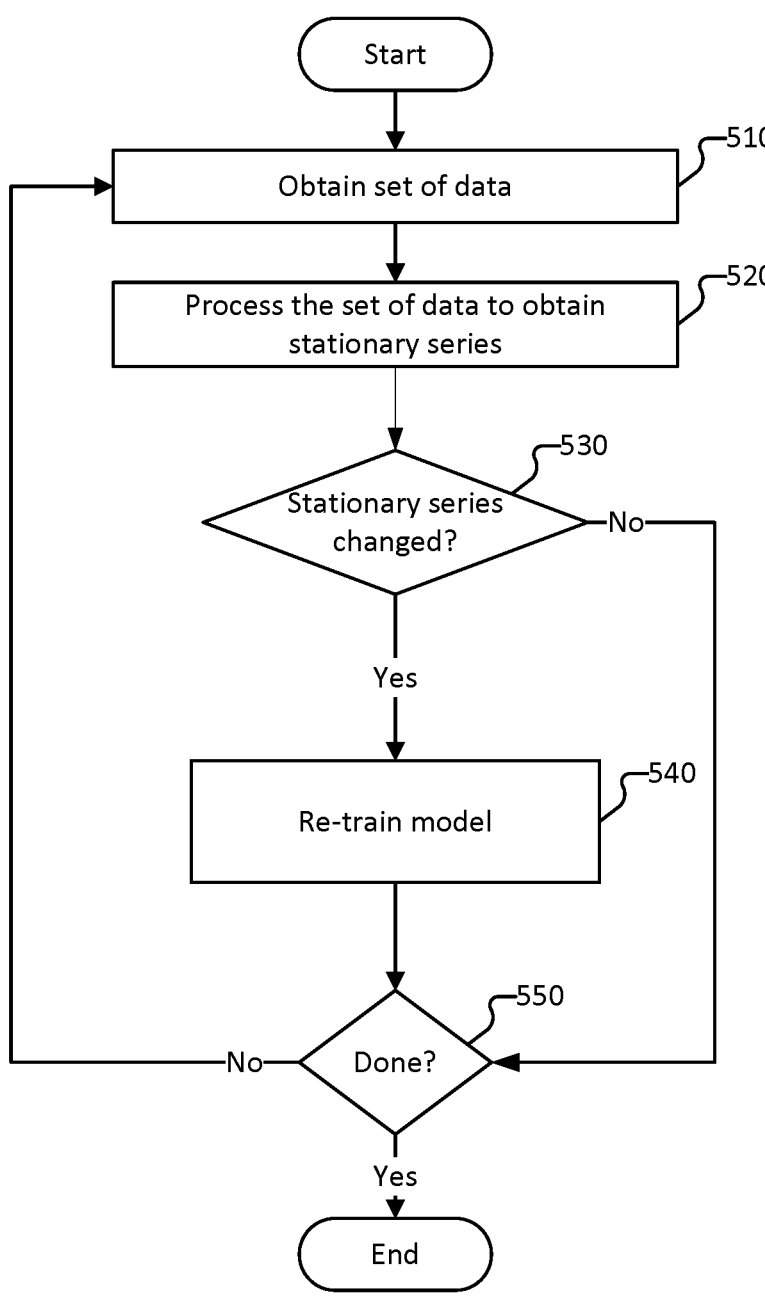
FIG. 5 is a flow diagram of a method for determining whether to re-train a model based at least in part on a change in data corresponding to the model according to various embodiments.

FIG. 5 is a flow diagram of a method for determining whether to re-train a model based at least in part on a change in data corresponding to the model according to various embodiments.

According to various embodiments, process 500 is implemented at least in part by system 100 of FIG. 1 and/or system 200 of FIG. 2. Process 500 may be implemented at least in part by system 400 of FIG. 4. In some embodiments, process 500 is implemented in connection with process 600 of FIG. 6, process 700 of FIG. 7, and/or process 800 of FIG. 8.

At 510, a set of data is obtained. In some embodiments, the system obtains the set of data from one or more data stores. In some embodiments, the system determines a model for which temporal drift of corresponding data is to be assessed, and then determines the set of data corresponding to the model. As an example, the system queries a mapping of models to data (e.g., a mapping of identifiers of models to identifiers or pointers for corresponding data). As an example, the system determines the model for which temporal drift of corresponding data is to be assessed based at least in part on a command received to invoke process 500. As another example, the system determines the model for which temporal drift of corresponding data is to be assessed based at least in part on an iteration over a set of models for periodic assessment of temporal drift. In some embodiments, the periodic assessment of temporal drift is in accordance with a predetermined interval. For example, the predetermined intervals is daily (e.g., midnight or such other time when traffic or a number of queries is minimal or below a preset threshold). Various other predetermined intervals may be implemented, including weekly, monthly, every other day, etc.

In some embodiments, the set of data corresponds to customer data stored in a data store. As an example, the customer data includes information pertaining to one or more occurrences within the customer system. As another example, the customer data includes network information pertaining to a customer system.

In some embodiments, the set of data corresponds to information pertaining to a network system. For example, the set of data includes attributes of traffic across a customer network, ingress traffic, egress traffic, attributes of a file communicated over the network, attributes of domains associated with traffic, etc.

At 520, the set of data is processed to obtain a stationary series. In some embodiments, the system pre-processes the set of data in connection with determining whether temporal drift has occurred with respect to such set of data.

According to various embodiments, the processing the set of data to obtain the stationary series comprises pre-processing the set of data to de-seasonalize the set of data (e.g., removing a seasonal component from the set of data).

According to various embodiments, the converting the set of data to stationary series (e.g., to make the time series data stationary) includes using the Augmented Dickey-Fuller process/test to make the set of data stationary. A set of previous observations is be subtracted from current observations. For example, the determination of whether temporal drift has occurred with respect to the set of data used by the model is more computational intensive the longer then period of time for which time series data corresponds. In some embodiments, the data corresponding to observations that occurred a predetermined period of time in the past (e.g., the previous observations) are removed from the data used for detection of whether temporal drift has occurred. In some embodiments, the predetermined period of time in the past is 4 days. Various other time intervals may be used for the predetermined period of time, such as 12 hours, 3 days, 5 days, 7 days, 14 days, a month, a year, etc.

According to various embodiments, the fitting a seasonal component of the stationary data to time series data includes using a boosted embeddings process/model to fit a seasonal component to time series data. The boosted embeddings process/model employs gradient boosting of deep models with embedding in the context of time-series forecasting. As an example, the boosted embedding process/model executes a loop wherein at each iteration embeddings are added for each model, the previous embeddings are frozen, and keep growing the networks.

At 530, a determination of whether the stationary series has changed is performed. In some embodiments, the system determines whether the stationary series has changed based at least in part on an extent of a change (or extent of a difference) between the stationary series and the training data (e.g., the data used to train the corresponding model).

In some embodiments, the system determines whether an extent of the difference or change exceeds a preset change threshold (e.g., a statistical threshold). As an example, the preset change threshold may be three standard deviations such as three standard deviations from the training data. As another example, the preset change threshold may be four standard deviations. Various other statistical measures may be implemented as the preset change threshold. In some embodiments, in response to determining that the difference or change exceeds the preset change threshold (e.g., the statistical threshold), the system deems that stationary series has changed.

In some embodiments, the determining whether the stationary series has changed comprises computing a Z-score with respect to the stationary series (e.g., the resultant stationary series, or the residual model after removing the seasonality, etc.) and comparing the computed Z-score with the Z-score of the training data used to train the model. If a difference between the computed Z-score with respect to the stationary series and the Z-score of the training data used to train the model is greater than a predefined change In response to determining that the stationary series has not changed at 530, process 500 proceeds to 550. Conversely, in response to determining that the stationary series has changed at 530, process 500 proceeds to 540 at which a model is re-trained. As an example, the re-training the model includes invoking (e.g., instructing or requesting) a model service to re-train (or update) the model (e.g., based on the set of data such as a set of current observations, etc.). As another example, the system uses at least part of the set of data to re-train the model.

At 550, a determination is made as to whether process 500 is complete. In some embodiments, process 500 is determined to be complete in response to a determination that no further sets of data are to be analyzed (e.g., no further models are to be assessed for temporal drift with respect to input data, no further sets of data are to be assessed for temporal drift, etc.), an administrator indicates that process 500 is to be paused or stopped, etc. In response to a determination that process 500 is complete, process 500 ends. In response to a determination that process 500 is not complete, process 500 returns to 510.

Figure 6:
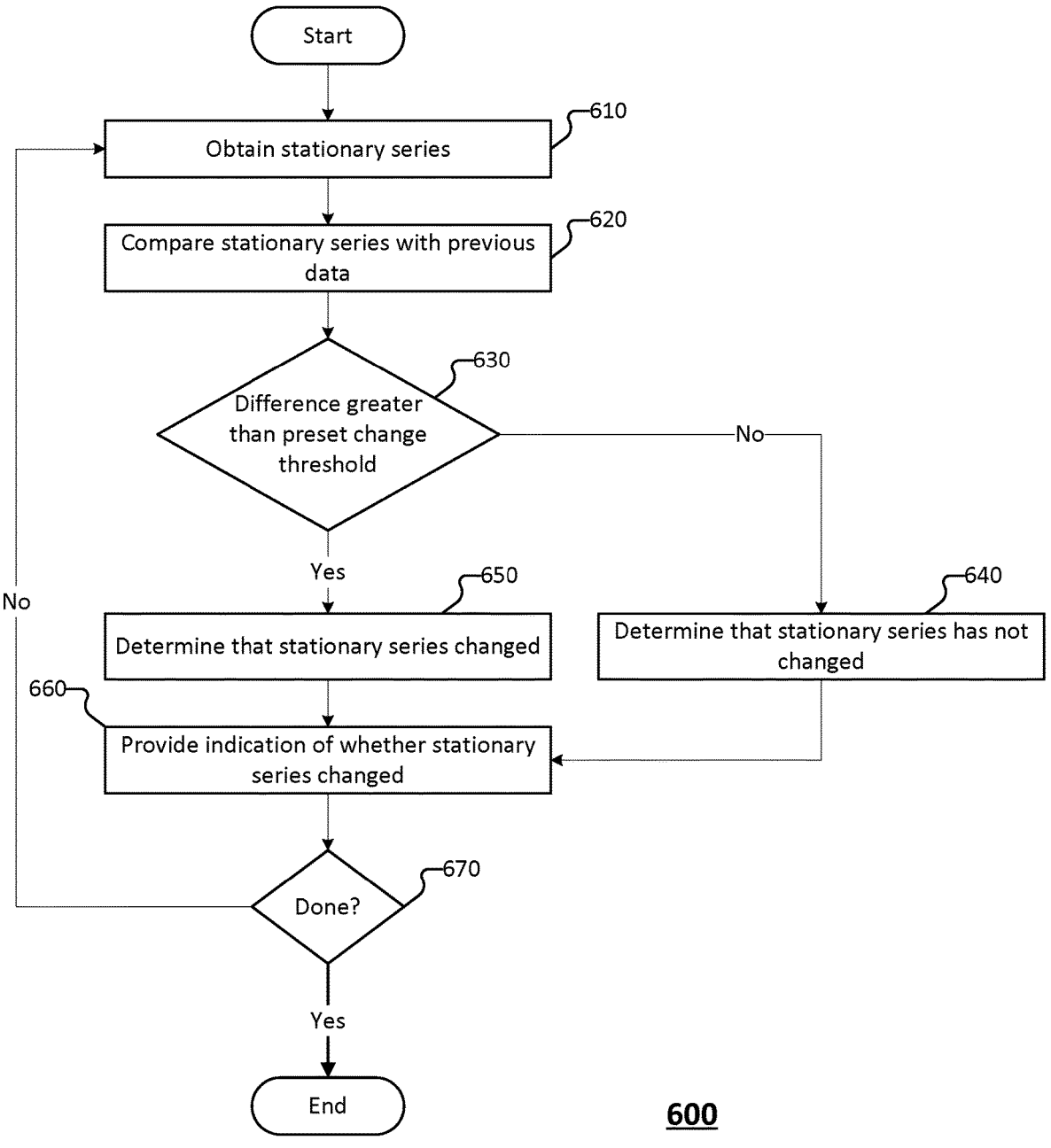
FIG. 6 is a flow diagram of a method for determining whether data corresponding to a model has changed according to various embodiments.

FIG. 6 is a flow diagram of a method for determining whether data corresponding to a model has changed according to various embodiments.

According to various embodiments, process 600 is implemented at least in part by system 100 of FIG. 1 and/or system 200 of FIG. 2. Process 600 may be implemented at least in part by system 400 of FIG. 4. In some embodiments, process 600 is implemented in process 700 of FIG. 7, and/or process 800 of FIG. 8.

According to various embodiments, process 600 is invoked in connection with determining whether the stationary series has changed. In some embodiments, process 600 is invoked in connection with 530 of process 500 of FIG. 5.

At 610, a stationary series is obtained. In some embodiments, the system obtains (e.g., receives) the stationary series in connection with an invocation of process 600. For example, the system receives the stationary series (or a location from which the stationary series can be retrieved) in connection with 530 of process 500 invoking process 600.

In some embodiments, the obtaining the stationary series comprises obtaining a set of data used by a model in connection with providing a prediction (e.g., to respond to a query, provide an estimate, etc.), pre-processing the data to determine whether temporal drift has occurred. As an example, the pre-processing the data includes removing information deemed trivial (e.g., stale data such as data older than a predetermined time, for example older than 4 days, etc.).

Figure 7:
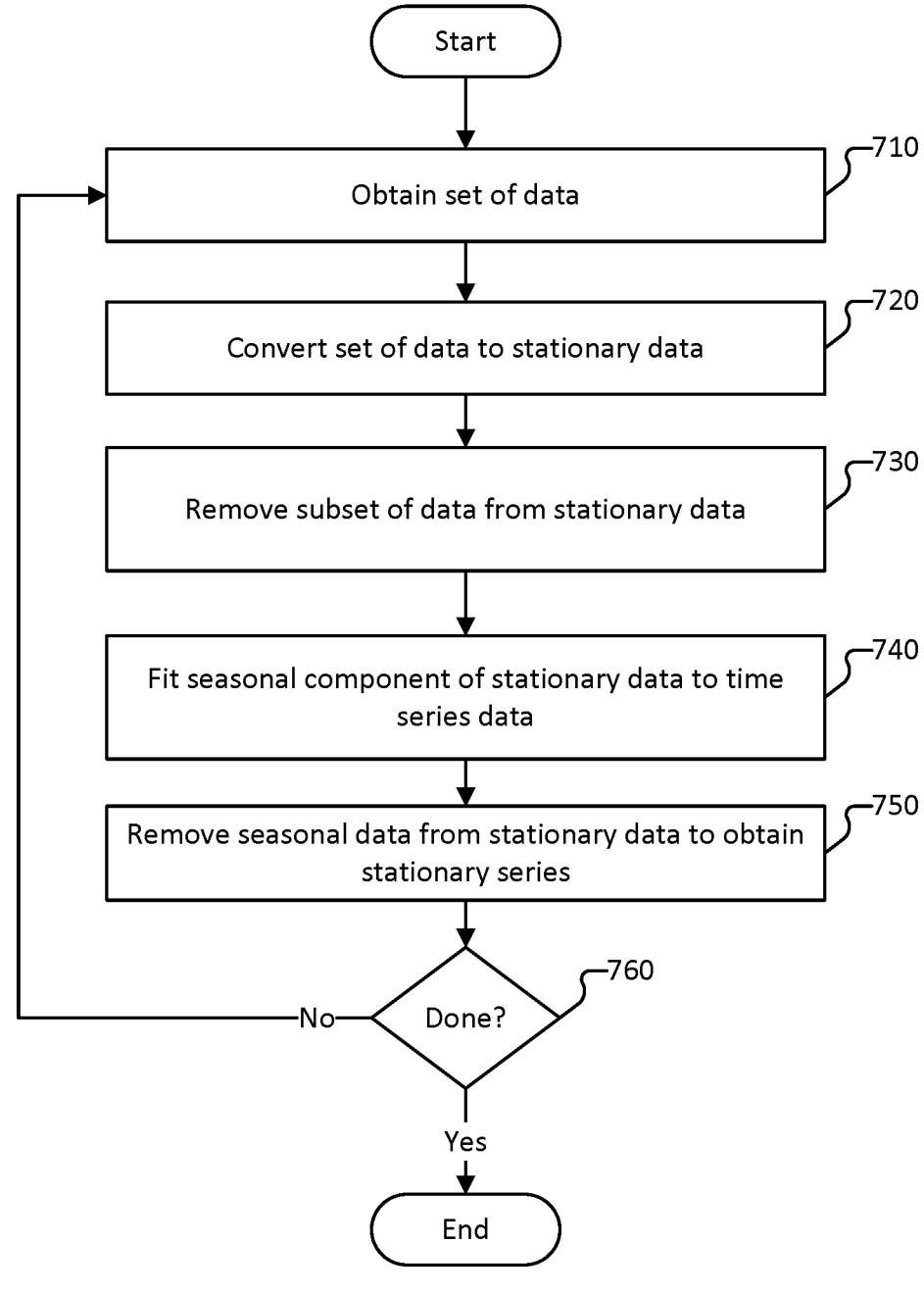
FIG. 7 is a flow processing data to detect a temporal drift in data corresponding to a model according to various embodiments.

In some embodiments, the obtaining the stationary series comprises invoking process 700 of FIG. 7.

At 620, the stationary series is compared with previous data. In some embodiments, the comparing the stationary series with previous data includes determining one or more statistical attributes associated with the stationary series and the previous data (e.g., the data used to train the corresponding model). As an example, the statistical attributes include a mean, a variance, a standard deviation, a Z-score, etc. Various other statistical attributes can be used in connection with determining whether temporal drift has occurred.

At 630, a determination of whether a difference between the stationary series and the previous data is greater than the preset change threshold is performed.

In response to determining that difference between the stationary series and the previous data is not greater than the preset change threshold at 630, process 600 proceeds to 640 at which the stationary series is determined to have not changed. For example, the system deems the stationary series as being unchanged in relation to the training data used to train the corresponding model (e.g., the system determines the model does not need to be re-trained on account for temporal drift). Thereafter, process 600 proceeds to 660.

In response to determining that difference between the stationary series and the previous data is greater than (or greater than or equal to) the preset change threshold at 630, process 600 proceeds to 650 at which the stationary series is determined to have changed. For example, the system deems the stationary series as having changed (e.g., temporal drift occurred) in relation to the training data used to train the corresponding model (e.g., the system determines the model is to be re-trained on account for temporal drift). Thereafter, process 600 proceeds to 660.

At 660, an indication of whether the stationary series changed is provided. In some embodiments, the system provides an indication of whether the stationary series changed to another module of the system or to another system or device in connection with a determination of whether to re-train a corresponding model. For example, at 660, the system returns a result to a system processing process 500 of FIG. 5 (e.g., in connection with 530 of process 500).

At 670, a determination is made as to whether process 600 is complete. In some embodiments, process 600 is determined to be complete in response to a determination that no further stationary series are to be analyzed (e.g., no further models are to be assessed for temporal drift with respect to input data, no further sets of data are to be assessed for temporal drift, etc.), an administrator indicates that process 600 is to be paused or stopped, etc. In response to a determination that process 600 is complete, process 600 ends. In response to a determination that process 600 is not complete, process 600 returns to 610.

FIG. 7 is a flow processing data to detect a temporal drift in data corresponding to a model according to various embodiments.

According to various embodiments, process 700 is implemented at least in part by system 100 of FIG. 1 and/or system 200 of FIG. 2. Process 700 may be implemented at least in part by system 400 of FIG. 4. In some embodiments, process 700 is implemented in connection with process 500 of FIG. 5, process 600 of FIG. 6, and/or process 800 of FIG. 8.

In some embodiments, process 700 is invoked in connection with 520 of FIGS. 5 and/or 610 of process 600 of FIG. 6.

At 710, a set of data is obtained. In some embodiments, the system obtains (e.g., receives) the set of data in connection with an invocation of process 700. For example, the system receives the stationary series (or a location from which the stationary series can be retrieved) in connection with 610 invoking process 700.

At 720, the set of data is converted to stationary data. At 730, a subset of data is removed from the stationary data. According to various embodiments, the converting the set of data to stationary data (e.g., to make the time series data stationary) includes using the Augmented Dickey-Fuller process/test to make the set of data stationary. A set of previous observations is subtracted from current observations. For example, the determination of whether temporal drift has occurred with respect to the set of data used by the model is more computational intensive the longer then period of time for which time series data corresponds. In some embodiments, the data corresponding to observations that occurred a predetermined period of time in the past (e.g., the previous observations) are removed from the data used for detection of whether temporal drift has occurred. In some embodiments, the predetermined period of time in the past is 4 days. Various other time intervals may be used for the predetermined period of time, such as 12 hours, 3 days, 5 days, 7 days, 14 days, a month, a year, etc.

At 740, a seasonal component of stationary data is fit to series data. According to various embodiments, the fitting a seasonal component of the stationary data to time series data includes using a boosted embeddings process/model to fit a seasonal component to time series data. In some embodiments, the boosted embeddings process/model uses gradient boosting of deep models with embedding in the context of time-series forecasting. As an example, the boosted embedding process/model executes a loop wherein at each iteration embeddings are added for each model, the previous embeddings are frozen, and keep growing the networks.

At 750, the seasonal component is removed from a stationary data to obtain a stationary series. In some embodiments, the seasonal component is removed from the stationary data to obtain the resultant stationary series.

At 760, a determination is made as to whether process 700 is complete. In some embodiments, process 700 is determined to be complete in response to a determination that no further sets of data are to be pre-processed (e.g., no further models are to be assessed for temporal drift with respect to input data, no further sets of data are to be assessed for temporal drift, etc.), an administrator indicates that process 700 is to be paused or stopped, etc. In response to a determination that process 700 is complete, process 700 ends. In response to a determination that process 700 is not complete, process 700 returns to 710.

Figure 8:
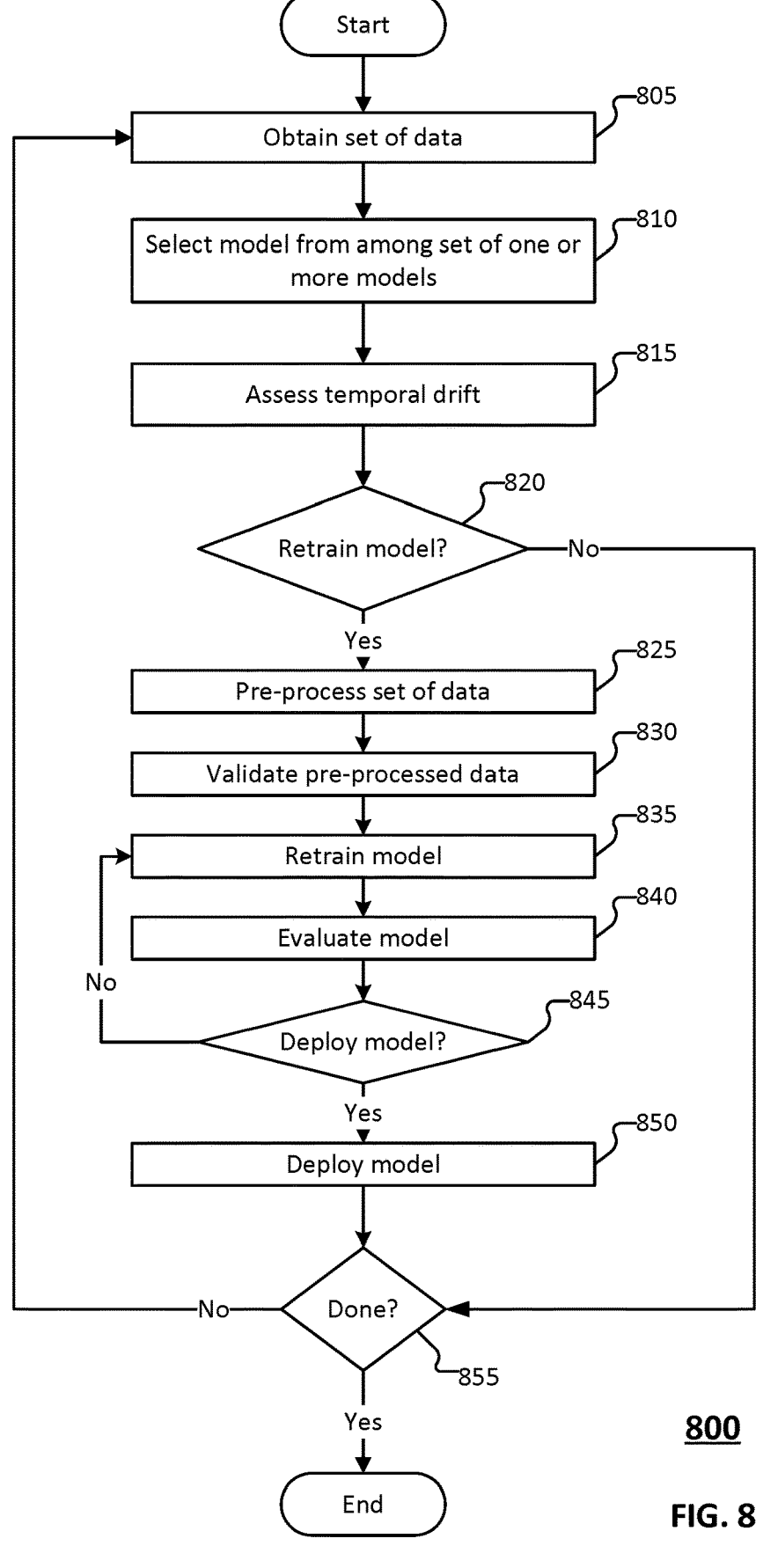
FIG. 8 is a flow diagram of a method for maintaining a model according to various embodiments.

FIG. 8 is a flow diagram of a method for maintaining a model according to various embodiments.

According to various embodiments, process 800 is implemented at least in part by system 100 of FIG. 1 and/or system 200 of FIG. 2. Process 800 may be implemented at least in part by system 400 of FIG. 4. In some embodiments, process 800 is implemented in connection with process 500 of FIG. 5, process 600 of FIG. 6, and/or process 700 of FIG. 7.

At 805, a set of data is obtained. In some embodiments, 805 correspond to, or is similar to, 510 of process 500 of FIGS. 5 and/or 710 of process 700 of FIG. 7.

At 810, a model is selected form a set of one or more models. In some embodiments, the system determines a model corresponding to the set of data. For example, the system queries a mapping of models to data to determine one or more models that use the set of data (e.g., data from a particular data source). If a plurality of models are associated with (e.g., mapped to) the set of data, then the system selects a model from among such plurality of models. For example, the system iterates over the plurality of models to determine whether to re-train the models. In some embodiments, if a plurality of model are associated with the set of data, a determination of whether temporal drift has occurred is applicable to all models of the plurality of models associated with the set of data.

At 815, temporal drift is assessed. In some embodiments, the system determines whether temporal drift has occurred with respect to the set of data (e.g., in relation to training data used to train the model). For example, the system determines whether an extent of a difference between the set of data and the training data exceeds a predetermined change threshold.

In some embodiments, assessment of the temporal drift includes invoking process 700 of FIG. 7, such as to obtain a resultant stationary series with which to assess temporal drift. In some embodiments, assessment of the temporal drift includes invoking process 600 of FIG. 6 to determine whether the set of data has changed (e.g., whether temporal drift has occurred).

At 820, a determination of whether to re-train the model is performed. In some embodiments, the system determines to re-train the model in response to determining that temporal drift has occurred. For example, the system determines to re-train a set of models associated with the set of data in response to determining that an extent of temporal drift exceeds a predetermined threshold (e.g., a predetermined change threshold, etc.).

In response to a determination to not re-train the model at 820, process 800 proceeds to 855. Conversely, in response to a determination re-train the model at 820, process 800 proceeds to 825 at which the set of data is pre-processed. In some embodiments, the pre-processing the data includes cleaning, aligning data for jitters, removing Not a Numbers (NaNs), cleaning up for duplicates, handling gaps using interpolation, etc.

At 830, the pre-processed data is validated.

At 835, the model is re-trained. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

At 840, the model is evaluated. In some embodiments, the evaluating the model includes computing a reconstruction score of the current model (e.g., the re-trained model) on current data with the previously deployed model (e.g., the model being re-trained/updated) on current data. In some embodiments, the evaluating the model comprises determining an accuracy of a model (e.g., an accuracy of predictions, a percentage of false positives or false negatives in providing predictions such as with respect to maliciousness of files, traffic, domains, etc.).

At 845, a determination of whether to deploy is performed. If the current model performs better than the previously deployed model and/or better than a predetermined performance threshold (e.g., an accuracy threshold, etc.), the current model the system determines to deploy the model. For example, the model is published (e.g., deployed) to a model service. In some embodiments, if the current model does not perform better than the previously deployed model, or if the current model performs less than the predetermined performance threshold, the system determines to not deploy the current model, and another model is trained.

In response to determining to deploy the model at 845, process 800 proceeds to 850 at which the model is deployed. As an example, the deploying the model includes configuring a model service to use the re-trained model to service queries (e.g., to provide predictions/estimates, etc.). As another example, the deploying the model includes storing the re-trained model at a predetermined location (e.g., a ML model data store, such as a data store associated with a model service, etc.).

Conversely, in response to determining not to deploy the model at 845, process 800 returns to 835 at which another attempt to re-train the model is performed. In some embodiments, process 800 returns to 825 at which the data is pre-processed again in connection with the other attempt to re-train the model. In some embodiments, the system iterates over re-training a model until an acceptable model is re-trained (e.g., a model that satisfies a performance criteria such as a performance threshold, etc.). In some embodiments, the system iterates over a set of machine learning processes to re-train a model until all machine learning processes are exhausted, or until an acceptable model is obtained. In some embodiments, the iteration of attempting to re-train a model is attempted for a threshold number of attempts or until a user (e.g., an administrator) instructs the system to cease attempting to re-train the model. If the model is not successfully retrained before exhausting the set of machine learning models, a threshold number of re-training attempts has been reached, or the user instructs the system to cease attempting to re-train the model, the system uses the currently deployed model.

At 855, a determination is made as to whether process 800 is complete. In some embodiments, process 800 is determined to be complete in response to a determination that no further sets of data are to be analyzed (e.g., no further models are to be assessed for temporal drift with respect to input data, no further sets of data are to be assessed for temporal drift, etc.), an administrator indicates that process 800 is to be paused or stopped, etc. In response to a determination that process 800 is complete, process 800 ends. In response to a determination that process 800 is not complete, process 800 returns to 810.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

obtain a stream of time-series data that is used by a machine learning model to detect network traffic anomalies;

iteratively analyze a current set of data selected from the stream in connection with detecting a temporal drift by:

processing the set of data to convert the set of data to stationary data;

removing a subset of the stationary data deemed trivial;

fitting a seasonal component of the stationary data to time series data using a boosted embeddings model;

removing seasonal data from the stationary data to obtain a resultant stationary series;

determining that a resultant stationary series has changed from training data based at least in part on a predefined threshold associated with contextual factors including one or more of time of day, network load and device configurations, wherein the threshold for determining drift is dynamically adjusted based at least in part on characteristics of the current set of data; and in response to determining that the resultant stationary series has changed, automatically updating the machine learning model to obtain an updated machine learning model, wherein the machine learning model is trained based at least in part on a set of training data, and updating the machine learning model includes retraining the machine learning model based at least in part on the current set of data, and the machine learning model is retrained at least near real-time with respect to the detection of the temporal drift; and deploy the updated machine learning model at a security service that is configured to use the machine learning model to detect network traffic anomalies; and a memory coupled to the one or more processors and configured to provide the one or more processors with instructions.

2. The system of claim 1, wherein the one or more processors are further configured to:

train the machine learning model based at least in part on a set of training data.

3. The system of claim 1, wherein the one or more processors are further configured to:

receive the machine learning model.

4. The system of claim 1, wherein the one or more processors are further configured to:

dynamically update the machine learning model based on the temporal drift.

5. The system of claim 4, wherein the machine learning model is dynamically updated based on the temporal drift after a first period of time since a previous training of the machine learning model.

6. The system of claim 4, wherein the dynamically updated machine learning model is deployed to an enterprise security device or service.

7. The system of claim 4, wherein the machine learning model is not dynamically updated before detection of the temporal drift detection.

8. The system of claim 1, wherein the machine learning model is used in connection with detecting malicious traffic.

9. The system of claim 1, wherein the machine learning model is used in connection with detecting malicious domains.

10. The system of claim 1, wherein:

analyzing the set of data in connection with detecting the temporal drift comprises obtaining a set of time series data.

11. The system of claim 1, wherein the determining that the resultant stationary series has changed comprises:

determining that an extent of a difference between the resultant stationary series and the training data is greater than a preset change threshold.

12. The system of claim 11, wherein the training data comprises a previously resultant stationary series.

13. The system of claim 11, wherein the preset change threshold is three standard deviations.

14. The system of claim 1, wherein the boosted embeddings model fits the seasonal component by leveraging embeddings to learn seasonality or unknown cycles from multiple categorical time features including one or more of hour of day, day of week, month of year, and holiday indicators, and wherein the boosted embeddings model employs gradient boosting of deep models such that previous embeddings are frozen in each iteration while new embeddings are added to solve a residual model.

15. The system of claim 1, wherein determining that the resultant stationary series has changed from training data comprises computing a Z-score of the resultant stationary series with respect to the training data and determining that the Z-score exceeds the predefined threshold, and wherein the threshold is dynamically adjusted based at least in part on one or more of:

(a) variance or distribution characteristics of the current set of data;

(b) time of day or day of week at which the current set is obtained;

(c) current network load measured during the current set, and (d) device configuration parameters associated with sources of the current set of data.

16. The system of claim 1, wherein the machine learning model is not automatically updated for drift before the determination that the resultant stationary series has changed.

17. A method, comprising:

obtaining a stream of time-series data that is used by a machine learning model to detect network traffic anomalies;

iteratively analyze a current set of data selected from the stream in connection with detecting a temporal drift by:

processing the set of data to convert the set of data to stationary data;

removing a subset of the stationary data deemed trivial;

fitting a seasonal component of the stationary data to time series data using a boosted embeddings model;

removing seasonal data from the stationary data to obtain a resultant stationary series;

determining that a resultant stationary series has changed from training data based at least in part on a predefined threshold associated with contextual factors including one or more of time of day, network load and device configurations, wherein the threshold for determining drift is dynamically adjusted based at least in part on characteristics of the current set of data; and in response to determining that the resultant stationary series has changed, automatically updating the machine learning model to obtain an updated machine learning model, wherein the machine learning model is trained based at least in part on a set of training data, and updating the machine learning model includes retraining the machine learning model based at least in part on the current set of data, and the machine learning model is retrained at least near real-time with respect to the detection of the temporal drift; and deploying the updated machine learning model at a security service that uses the machine learning model to detect network traffic anomalies.

18. A computer program product embodied in a non-transitory computer readable medium and comprising computer instructions for:

obtaining a stream of time-series data that is used by a machine learning model to detect network traffic anomalies;

iteratively analyze a current set of data selected from the stream in connection with detecting a temporal drift by:

processing the set of data to convert the set of data to stationary data;

removing a subset of the stationary data deemed trivial;

fitting a seasonal component of the stationary data to time series data using a boosted embeddings model;

removing seasonal data from the stationary data to obtain a resultant stationary series;

determining that a resultant stationary series has changed from training data based at least in part on a predefined threshold associated with contextual factors including one or more of time of day, network load and device configurations, wherein the threshold for determining drift is dynamically adjusted based at least in part on characteristics of the current set of data; and in response to determining that the resultant stationary series has changed, automatically updating the machine learning model to obtain an updated machine learning model, wherein the machine learning model is trained based at least in part on a set of training data, and updating the machine learning model includes retraining the machine learning model in based at least in part on the current set of data, and the machine learning model is retrained at least near real-time with respect to the detection of the temporal drift; and deploying the updated machine learning model at a security service that uses the machine learning model to detect network traffic anomalies.

* * * * *